（12) United States Patent
Martin et al.

(10) Patent No.: US 11,886,437 B2
(45) Date of Patent: Jan. 30, 2024

(54) REDUCED LATENCY QUERY PROCESSING

(71) Applicant: INTERNATIONAL BUSINESS MACHINES CORPORATION, Armonk, NY (US)

(72) Inventors: Daniel Martin, Leinfelden-Echterdingen (DE); Sowmya Kameswaran, San Jose, CA (US); Vassil Radkov Dimov, Stuttgart (DE); Christian Michel, Sindelfingen (DE); Manogari Nogi Simanjuntak, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/643,235

(22) Filed: Dec. 8, 2021

(65) Prior Publication Data
US 2023/0177054 A1    Jun. 8, 2023

(51) Int. Cl.
G06F 16/00    (2019.01)
G06F 16/2455    (2019.01)
(Continued)

(52) U.S. Cl.
CPC .... G06F 16/24561 (2019.01); G06F 16/2471 (2019.01); G06F 16/27 (2019.01)

(58) Field of Classification Search
CPC . G06F 16/24561; G06F 16/2471; G06F 16/27
See application file for complete search history.

(56) References Cited

U.S. PATENT DOCUMENTS

| 5,799,173 A | 8/1998 | Gossler et al. |
| 7,519,736 B2 | 4/2009 | Parham et al. |

(Continued)

FOREIGN PATENT DOCUMENTS

| CN | 108108431 A | 6/2018 |
| CN | 109241194 A | 1/2019 |
| WO | WO2014122555 A1 | 8/2014 |

OTHER PUBLICATIONS

Mell, Peter, et al., "The NIST Definition of Cloud Computing", NIST Special Publication 800-145, Sep. 2011, Gaithersburg, MD, 7 pgs.

(Continued)

*Primary Examiner* — Alexander Khong
(74) *Attorney, Agent, or Firm* — Stephanie Carusillo; George S. Blasiak; Heslin Rothenberg Farley & Mesiti P.C.

(57) ABSTRACT

Methods, computer program products, and systems are presented. The method computer program products, and systems can include, for instance: receiving by primary database system a query statement that references a first table, wherein the primary database system is associated to a first accelerator database system and a second accelerator database system, wherein modifications performed on tables of the primary database system are iteratively replicated into the first accelerator database system and the second accelerator database system; examining latency data that specifies a latency with which a modification to the first table has been replicated into the first accelerator database system and a latency with which a modification to the first table has been replicated into the second accelerator database system; selecting, in dependence on the examining, the first accelerator database system for execution of the query statement;

(Continued)

routing the query statement to the first accelerator database system for execution in response to the selecting.

20 Claims, 10 Drawing Sheets

(51) Int. Cl.
*G06F 16/27* (2019.01)
*G06F 16/2458* (2019.01)

(56) References Cited

U.S. PATENT DOCUMENTS

| 7,788,223 | B2 | 8/2010 | Liu et al. |
| 9,489,222 | B2 | 11/2016 | Zlotkin |
| 9,632,828 | B1 | 4/2017 | Mehta et al. |
| 10,275,507 | B2 | 4/2019 | Hrle et al. |
| 10,496,668 | B1* | 12/2019 | Meiri ................. G06F 16/2255 |
| 11,182,260 | B1* | 11/2021 | Beier ................. G06F 11/2094 |
| 2004/0186832 | A1* | 9/2004 | Jardin ................. G06F 16/27 |
| 2007/0198986 | A1 | 8/2007 | Panziera et al. |
| 2016/0110439 | A1 | 4/2016 | Hrle et al. |
| 2016/0210328 | A1 | 7/2016 | Bendel et al. |
| 2017/0091228 | A1 | 3/2017 | Middlekauff et al. |
| 2018/0046643 | A1* | 2/2018 | Brodt ................. G06F 16/178 |
| 2018/0075059 | A1* | 3/2018 | Chen ................. G06F 16/1844 |
| 2018/0189370 | A1* | 7/2018 | Bendel ................. G06F 16/27 |
| 2019/0258732 | A1 | 8/2019 | Chakra et al. |
| 2019/0294614 | A1 | 9/2019 | Brodt et al. |
| 2020/0012659 | A1 | 1/2020 | Dageville et al. |
| 2020/0151195 | A1 | 5/2020 | Brodt et al. |
| 2020/0293501 | A1* | 9/2020 | Awasthi ................. G06F 3/0647 |
| 2021/0303466 | A1* | 9/2021 | Kondiles ................. G06F 16/221 |

OTHER PUBLICATIONS

International Search Report for International Patent Application No. PCT/IB2022/061719, filed Dec. 2, 2022, dated Feb. 24, 2023.
Written Opinion of the International Searching Authority for International Patent Application No. PCT/IB2022/061719, filed Dec. 2, 2022, dated Feb. 24, 2023.

* cited by examiner

REDUCED LATENCY QUERY PROCESSING

BACKGROUND

Structured Query Language (SQL) enabled databases are able to respond to SQL based query statements. SQL is the main specific language that can be used for managing data held in a relationship database management system (RDBMS). SQL can also be used for programming and managing data of a relational data stream management system (RDSMS). SQL can be used for handled structured data where the defined relationships are trained different entities and/or variables of the data. SQL can include various sublanguages including the Data Query Language (DQL), Data Definition Language (DDL), Data Control Language (DCL), and Data Manipulation Language (DML). With the use of SQL various operations can be performed on a database including, e.g., data query, data manipulation (insert, update, and/or delete), data definition (schema creation and modification), and data access control.

Data structures have been employed for improving operation of computer system. A data structure refers to an organization of data in a computer environment for improved computer system operation. Data structure types include containers, lists, stacks, queues, tables, and graphs. Data structures have been employed for improved computer system operation, e.g., in terms of algorithm efficiency, memory usage efficiency, maintainability, and reliability.

Artificial intelligence (AI) refers to intelligence exhibited by machines. Artificial intelligence (AI) research includes search and mathematical optimization, neural networks, and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: receiving by primary database system a query statement that references a first table, wherein the primary database system is associated to a first accelerator database system and a second accelerator database system, wherein modifications performed on tables of the primary database system are iteratively replicated into the first accelerator database system and the second accelerator database system; examining latency data that specifies a latency with which a modification to the first table has been replicated into the first accelerator database system and a latency with which a modification to the first table has been replicated into the second accelerator database system; selecting, in dependence on the examining, the first accelerator database system for execution of the query statement; routing the query statement to the first accelerator database system for execution in response to the selecting.

In another aspect, a computer program product can be provided. The computer program product can include a computer readable storage medium readable by one or more processing circuit and storing instructions for execution by one or more processor for performing a method. The method can include, for example: receiving by primary database system a query statement that references a first table, wherein the primary database system is associated to a first accelerator database system and a second accelerator database system, wherein modifications performed on tables of the primary database system are iteratively replicated into the first accelerator database system and the second accelerator database system; examining latency data that specifies a latency with which a modification to the first table has been replicated into the first accelerator database system and a latency with which a modification to the first table has been replicated into the second accelerator database system; selecting, in dependence on the examining, the first accelerator database system for execution of the query statement; routing the query statement to the first accelerator database system for execution in response to the selecting.

In a further aspect, a system can be provided. The system can include, for example a memory. In addition, the system can include one or more processor in communication with the memory. Further, the system can include program instructions executable by the one or more processor via the memory to perform a method. The method can include, for example: receiving by primary database system a query statement that references a first table, wherein the primary database system is associated to a first accelerator database system and a second accelerator database system, wherein modifications performed on tables of the primary database system are iteratively replicated into the first accelerator database system and the second accelerator database system; examining latency data that specifies a latency with which a modification to the first table has been replicated into the first accelerator database system and a latency with which a modification to the first table has been replicated into the second accelerator database system; selecting, in dependence on the examining, the first accelerator database system for execution of the query statement; routing the query statement to the first accelerator database system for execution in response to the selecting.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
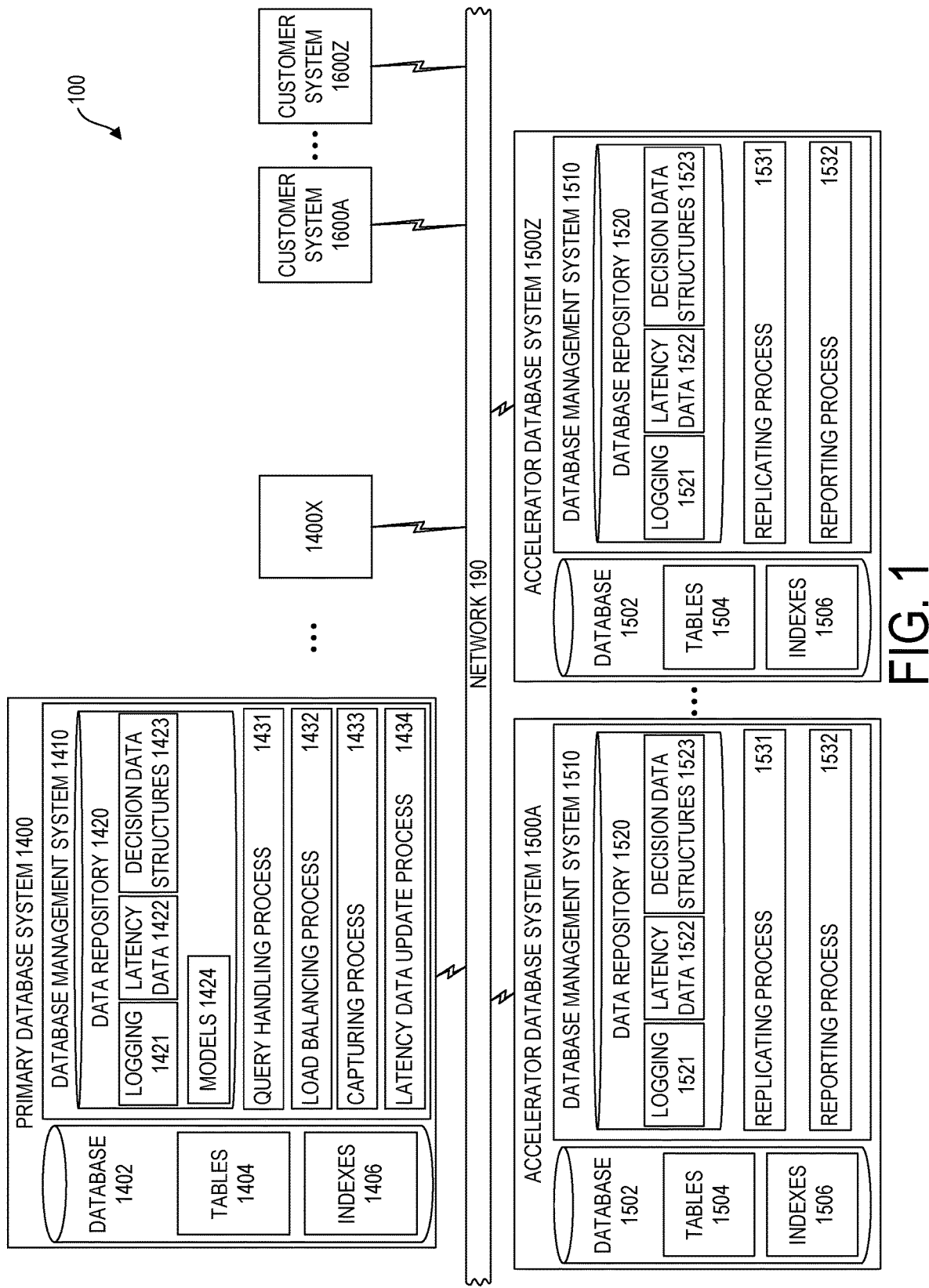
FIG. 1 is a schematic diagram of the system having a primary database system and a plurality of computer systems, according to one embodiment.

System 100 for use in the processing of database queries is set forth in one embodiment in FIG. 1. System 100 can include primary database system 1400, a plurality of accelerator database systems 1500A-1500Z, and a plurality of customer system 1600A-1600Z in communication with one another via network 190. Primary database system 1400, accelerator database systems 1500A-1500Z, and customer system 1600A-1600Z can be computing node-based systems in communication with one another via network 190. Network 190 can be a physical network and/or virtual network. A physical network can be, for example, a physical telecommunications network connecting numerous computing nodes or systems such as computer servers and computer clients. A virtual network can, for example, combine numerous physical networks or parts thereof into a logical virtual network. In another example, numerous virtual networks can be defined over a single physical network.

In one embodiment, each of primary database system 1400, accelerator database systems 1500A-1500Z, and customer system 1600A-1600Z can be external to one another, e.g., located on different computing nodes, e.g., different physical computing nodes. In one embodiment, one or more of primary database system 1400, accelerator database systems 1500A-1500Z, and/or customer systems 1600A-1600Z can be collocated with at least one of primary database system 1400, accelerator database systems 1500A-1500Z, and/or customer systems 1600A-1600Z.

System 100 can be configured so that query statements of a first classification can be executed by primary database system 1400, and further so that query statements of a second classification can be executed by one or more accelerator database system of accelerator database systems 1500A-1500Z. In one implementation, query statements of a first classification for handling by primary database system 1400 can include primary database query statements involving transactions. Query statements for handling by an accelerator database system of accelerator database systems 1500A-1500Z can include accelerator database query statements involving analytics. Query statements involving transactions can be relatively short running query statements and query statements involving analytics can be relatively long running query statements.

In one embodiment, primary database system 1400 can be differentiated from accelerator database systems 1500A-1500Z in terms of hardware configuration and/or software configuration.

In one embodiment, primary database system 1400 can be optimized for online transaction processing (OLTP) workloads. In one embodiment, primary database system 1400 can include a row store database management system (DBMS) more suited for processing of OLTP workloads. In one embodiment, accelerator database systems 1500A-1500Z can feature particularized hardware architecture, e.g., field programmable gate array (FPGA). In one embodiment, accelerator database systems 1500A-1500Z can include a column store database management system (DBMS) more suited for processing of OLAP workloads.

In one embodiment, primary database system 1400 can include row store tables and accelerator database systems of accelerator database systems 1500A-1500Z can include column store tables. Providing differently configured database systems for handling different classifications of query statements, system 100 can provide improved performance relative to the system in which all received query statements are processed by a single database system.

Embodiments herein recognize that database users can require complex analytics and reporting on their transactional data. For example, a history of credit cards transactions can be analyzed for purchase trends or financial risk reporting. However, embodiments herein recognize that a DBMS that is optimized for OLTP workloads like the one handling credit cards or ATM transactions may not be suitable for performance of online analytical processing (OLAP) workloads. Embodiments herein recognize that a hybrid system that extends the OLTP capabilities of primary database system 1400 with OLAP capabilities of an accelerator database system can provide various advantages in terms of improved performance, simplified infrastructure, data management, and security.

Primary database system 1400 can include database 1402 and database management system 1410. Database 1402 can include tables 1404 and indexes 1406. Tables 1404 can logically organize data into columns and rows of data. A row of data within a table can define a record. Each table of tables 1404 can have associated thereto zero or more indexes of indexes 1406.

Database management system 1410 can include data repository 1420 provided by a logical data repository. Data repository 1420 in logging area 1421 can store logging data. The logging data can specify actions by database management system 1410 in the modifying a table of tables 1404 of database 1402. Data repository 1420 in latency data area 1422 can store latency data that specifies a latency (staleness) of table modifications replicated into one or more accelerator database system of accelerator database systems 1500A-1500Z.

System 100 can be configured so that database modifications performed within primary database system 1400 are replicated into one or more accelerator database system of accelerator database systems 1500A-1500Z. Because the replicated modifications to database tables within an accelerator database system will occur after the modification on primary database system 1400, the time at which a table modification within database 1402 is replicated within the accelerator database system will have a latency (staleness) with respect to the time at which the table of tables 1404 is originally modified.

Data repository 1420 in decision data structures area 1423 can store decision data structures, e.g., decision tables or decision trees, for use in return of action decisions. Database management system 1410 in models area 1424 can store various models such as machine learning trained models for use in return of action decisions. Models stored in models area 1424 can include machine learning models configured for return of regression-based predictions. A model stored in models area 1424 can include predictive models that predict the performance of a first accelerator database system relative to a second accelerator database system.

Database management system 1410 can run various processes. Database management system 1410 running query handling process 1431 can examine an incoming query statement and based on the examining can ascertain whether the query statement is to be handled by primary database system 1400 or by an accelerator database system of accelerator database systems 1500A-1500Z.

Database management system 1410 running query handling process 1431 can return an action decision to route an incoming query statement to an accelerator database system in dependence on a classification of an incoming query statement. System 100 can be configured so that query statements of first one or more classifications can be processed by primary database system 1400, and further so that query statements of a second one or more classification can be processed by one or more accelerator database system of accelerator database systems 1500A-1500Z.

Database management system 1410 can be configured so that incoming query statements classified as being primary database query statements can be executed by primary database system 1400, and further so that incoming query statements classified as being accelerator database query statements can be executed by an accelerator database system of accelerator database systems 1500A-1500Z.

In some use cases, primary database system 1400 can have a single associated accelerator database system, e.g., accelerator database system 1500A. In some use cases, primary database system 1400 can have a plurality of different associated accelerator database systems. For example, in one embodiment, primary database system 1400 can have first and second associated accelerator database systems provided by accelerator database system 1500A and accelerator database system 1500Z. Where a primary database system 1400 has first and second associated accelerator database systems, database management system 1410 can perform load balancing.

Database management system 1410 performing load balancing process 1432 can ascertain, in the case that an incoming query statement is to be executed by an accelerator database system, which of an associated accelerator database system is to execute the incoming query statement. Database management system 1410 running load balancing process 1432 in the case that an incoming query statement is to be processed and executed by an accelerator database system can ascertain whether a first accelerator database system, e.g., accelerator database system 1500A is to execute that incoming query statement or whether alternatively, the incoming query statement is to be executed by a second accelerator database system such as accelerator database system 1500Z.

Database management system 1410 running capturing process 1433 can include database management system 1410 capturing from logging area 1421 logging data that specifies actions performed by primary database system 1400 in the modification of a table of tables 1404 of database 1402. Modifications to a table can result, e.g., from execution at an iteration of execute block 2403 of one or more of an UPDATE statement, INSERT statement, or DELETE statement in SQL. Database management system 1410 running capturing process 1433 can include database management system 1410 sending the described logging data specifying actions of primary database system 1400 in modifying the table of Tables 1404 to one or more accelerator database system for receipt by a replicating process of the receiving accelerator database system so that the receiving replicating process can replicate the modifications of a table of tables 1404 within tables 1504 of database 1502.

Database management system 1410 running latency data update process 1434 can receive reporting data sent by one or more accelerator database system. On receipt of the described latency data, database management system 1410 running latency data update process 1434 can update latency data area 1422 of data repository 1420.

In one aspect, database management system 1410 running load balancing process 1432 can use the described latency data of latency data area 1422 in order to determine which of a plurality of associated accelerator database systems to send a received query statement to for execution. In one embodiment, database management system 1410 running load balancing process 1432 can transmit an incoming query statement to an accelerator database system of a set of accelerator database systems such as accelerator database system 1500A and accelerator database system 1500Z in dependence on a determination of which of the first or second accelerator database systems will execute the query statement faster with reduced latency.

In one embodiment, database management system 1410 running load balancing process 1432 can include database management system 1410 querying a set of predictive models, each predictive model of a set of predictive models being configured to predict a latency associated to a table modification replication by a certain accelerator database system, such as accelerator database system 1500A or accelerator database system 1500Z.

Database management system 1410 can establish a first predictive model for predicting a table modification replication latency of a certain table of accelerator database system 1500A and can establish a second predictive model that predicts a table modification replication latency associated to the certain table within accelerator database system 1500Z. Database management system 1410 in the described scenario can interrogate the first predictive model and the second predictive model and can select for execution of an incoming query statement the accelerator database system, i.e., 1500A or 1500Z, having the lowest return predicted latency. In such manner, database management system 1410 running query load balancing process 1432 can select for execution of an incoming query statement an accelerator database system that can be expected to exhibit reduced latency and fastest performance.

System 100, as noted, can be configured so that modifications performed on tables 1404 of primary database system 1400 can be replicated into tables 1504 of accelerator database systems 1500A-1500Z associated to primary database system 1400.

Respective accelerator database systems of accelerator database systems 1500A-1500Z can include instances of database 1502 and database management system 1510. Database 1502 can include tables 1504 and indexes 1506. Tables 1504 can logically organize data into columns and rows of data. A row of data within a table can define a record. Each table of tables 1504 can have associated thereto zero or more indexes of indexes 1506.

Database management system 1510 can include data repository 1520 configured as a logical data repository. Data repository 1520 in logging data area 1521 can store logging data that specifies actions for performance of replicated table modifications originally performed in database 1402 and replicated into database 1502. Data repository 1520 in latency data area 1522 can store latency data that specifies a staleness of a replicated table modification performed within one or more associated accelerator database system of accelerator database systems 1500A-1500Z with respect to a time at which an original table modification was performed within database 1402.

Data repository 1520 in decision data structures area 1523 can store decision data structures, e.g., decision tables and/or decision trees for return of action decisions by database management system 1510.

Database management system 1510 performing replicating process 1531 can include database management system 1510 replicating a table modification originally formed within tables 1404 of database 1402 of primary database system 1400 into tables 1504 of database 1502 of a respective accelerator database system of accelerator database systems 1500A-1500Z. Database management system 1510 performing replicating process 1531 can include database management system 1510 using logging data sent by capturing process 1433 to respective accelerator database system 1500A.

Database management system 1510 performing reporting process 1532 can include database management system 1510 ascertaining latency data that specifies a staleness of a replicated table modification performed within tables 1504 of an associated accelerator database system with respect to an original modification replicated by the replicating performed within tables 1404 of database 1402 of primary database system 1400. Database management system 1510 performing reporting process 1532 can further include database management system 1510 sending the described latency data to database management system 1410 of primary database system 1400 for handling by latency data update process 1434 of database management system 1410. In one embodiment, database management system 1410 running capturing process 1433 sends a timestamp specifying a most recent modification time for all replicated tables ($TS_{1-n}$) to accelerator database system 1500Z periodically on a heartbeat message for receipt by reporting process 1532 and replicating process 1531. Accelerator database system 1500A running reporting process 1532 can periodically send the latency data staleness information for all the tables in replication to database management process 1410 on a heartbeat message for receipt by latency data update process 1434.

Figure 2:
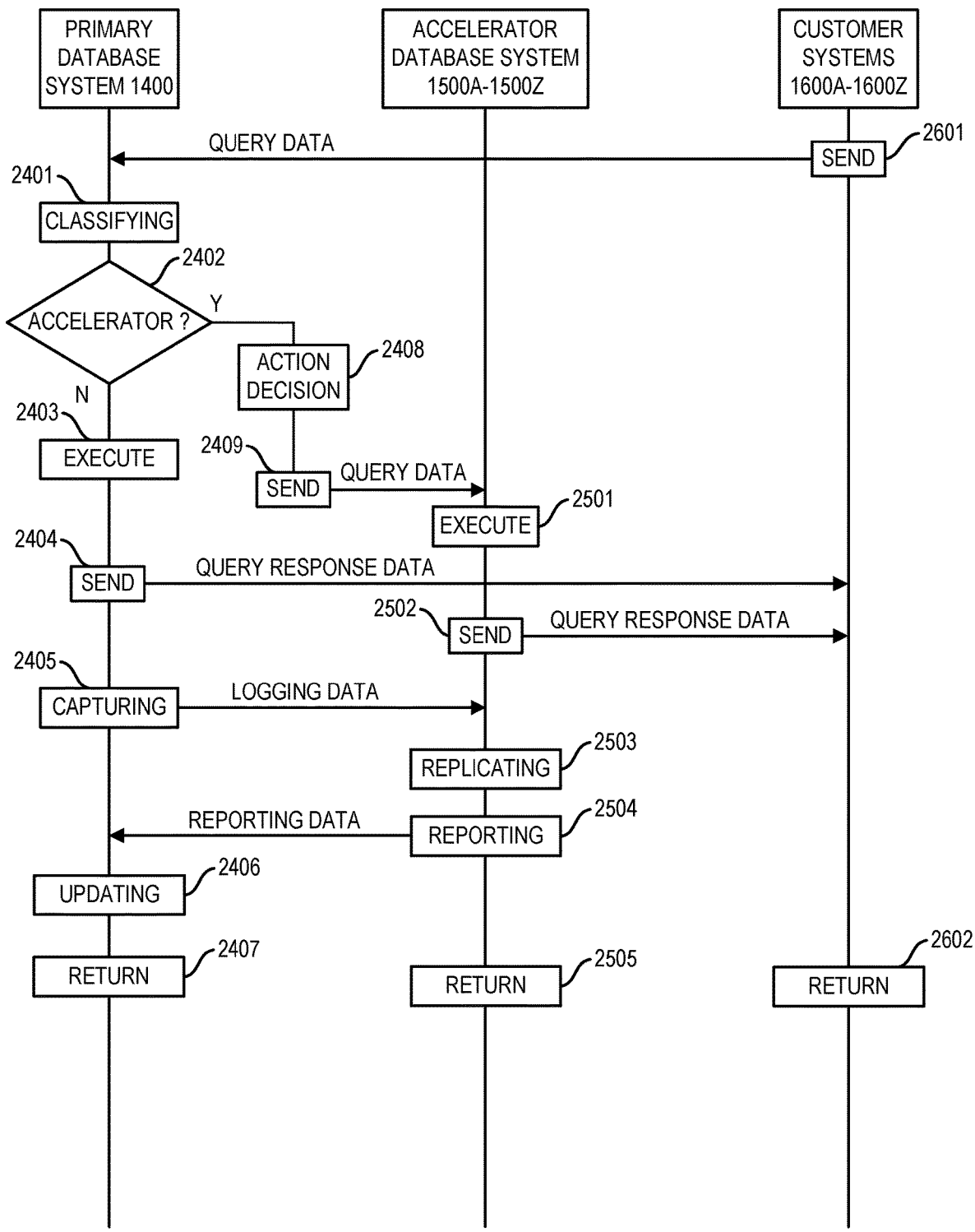
FIG. 2 is a flowchart illustrating a method for performance of a primary database system interoperating with one or more customer system and a plurality of accelerator database systems, according to one embodiment.

A method for performance by primary database system 1400 interoperating with customer system 1600A-1600Z and accelerator database systems 1500A-1500Z is described with reference to the flowchart of FIG. 2. At block 2601, customer service systems can be iteratively sending query data for receipt and processing by primary database system 1400. The query data iteratively sent at block 2601 can define query statements. In response to receipt of the query data, primary database system 1400 can handle the received query data by operation of query handling process 1431 as described with reference to FIG. 1. As set forth in reference to FIG. 1, primary database system 1400 running query handling process 1431 can include database management system 1410 of primary database system 1400 performing classifying of the receipt query data, and in response to the classifying, can include database management system 1400 ascertaining whether the received query data is to be executed by primary database system 1400 or by database system of accelerator database systems 1500A-1500Z. In response to the received query data sent at block 2601, primary database system 1400 at block 2401 can classify the received query data. In response to the classifying performed at block 2401, database management system 1410 at block 2402 can ascertain based on the classifying whether the received query data sent at block 2601 is to be executed by primary database system 1400 or by an accelerator database system of accelerator database systems 1500A-1500Z.

At block 2401, primary database system 1400 by database management system 1410 can perform classifying to determine whether the received query data defining a query statement is primary database processing query data, or alternatively, accelerator database processing query data. Primary database system 1400 by database management system 1410 in performing classification of incoming query statements can examine (a) complexity of the query as calculated by primary database system 1400 with more complex query statements more likely to be routed to an accelerator database system, (b) cost and/or duration to execute the query statement, with costlier and longer query statements more likely to be routed to an accelerator database system, (c) size and/or cardinality of tables referenced in the query statement, with query statements referencing larger tables more likely to be routed to an accelerator database system for execution, (d) availability of the table data referenced in a query statement (some tables may be included in one but not both of primary database system and an accelerator database system), and (e) explicit customer settings. At classifying block 2401 in some use cases, primary database system 1400 by database management system 1410 can perform keyword analysis for ascertaining whether the query data is primary database system query data or accelerator database query data.

At block 2402, in response to the classifying at block 2401 an incoming query statement as a primary database query statement, primary database system 1400 by database management system 1410 can proceed to block 2403.

At execute block 2403, primary database system 1400 by database management system 1410 can execute the incoming query statement defined by query data sent at block 2601. In response to the execution of the query statement at block 2403, primary database system 1400 by database management system 1410 can proceed to send block 2404. At send block 2404, database management system 1410 can send query response data to the customer system of the customer system 1600A-1600Z sending the query data sent at block 2601.

In response to the sending of query response data at block 2404, primary database system 1400 by database management system 1410 can proceed to block 2405. At block 2405, primary database system 1400 by database management system 1410 can perform capturing of logging data that has been logged into logging area 1421 of data repository 1420 as a result of the performance of execute block 2403 to execute the query data sent at block 2601. The logging data captured at 2405 can include logging data that specifies actions of database management system 1410 in the performance of a modification to a table of tables 1404 of database 1402 for use by one or more accelerator database system in replicating the modification. With the capturing of logging data captured at 2405, database management system 1410 further at block 2405 can perform sending of the captured logging data captured at block 2405 to accelerator database systems 1500A-1500Z, which have been associated to primary database system 1400. The sending of logging data by database management system 1410 to the associated accelerator database systems 1500A-1500Z associated to primary database system 1400 can facilitate the replication of table modifications performed within database 1402 on respective databases 1502 of the respective accelerator database systems 1500A-1500Z.

In response to receipt of the logging data sent at capturing block 2405, the accelerator database systems 1500A-1500Z at replicating block 2503 can perform replicating of a table modification performed at block 2403 with respect to a certain table of tables 1404 of database 1402 on the corresponding table of tables 1504 of database 1502 of the associated accelerator database systems 1500A-1500Z. In response to the performance of replicating at replicating block 2503, accelerator database systems 1500A-1500Z can perform reporting at block 2504. At block 2504, accelerator database systems 1500A-1500Z can send reporting data back to primary database system 1400. The reporting data can include latency data, which latency data specifies a staleness associated to a table modification replication performed at replicating block 2503. In one embodiment, the logging data sent by primary database system 1400 by database management system 1410 at capturing block 2405 can include timestamp data that specifies a time of table modification performed at execute block 2403. The reporting data reported at block 2504 can include the timestamp logging data specifying the time of a table modification performed at block 2403 and can also include a timestamp that specifies a time of performance of the replicating block 2503 replicating the table modification performed at execute block 2403 with respect to the table of database 1402 on a table of database 1502 on a respective accelerator database system of accelerator database systems 1500A-1500Z. While the flowchart of FIG. 2 depicts an embodiment wherein table modification replication proceeds in response to query statement execution, table modification replication, in another use case, can occur independent of any query statement execution.

Table A illustrates possible exemplary latency data reporting data over the course of processing of a plurality of query statements, namely query statement Q1, Q2, and Q3.

| Row | Query statement | Accelerator | Table modified | Original table modification time | Accelerator update time |
| --- | --- | --- | --- | --- | --- |
| 1 | Q1 | 1500A | TA | T1 | T1 + 0.4 ms |
| 2 | Q1 | 1500Z | TA | T1 | T1 + 0.2 ms |
| 3 | Q2 | 1500A | TB | T2 | T2 + 0.6 ms |
| 4 | Q2 | 1500Z | TB | T2 | T2 + 0.5 ms |
| 5 | Q3 | 1500A | TA | T3 | T3 + 0.2 ms |
| 6 | Q3 | 1500Z | TA | T3 | T3 + 0.3 ms |

Referring to Table A, it is seen that for a given table modification, different accelerator database systems of accelerator database systems 1500A-1500Z can replicate the table modification at different times. Table A illustrates instances of reporting data reported at block 2504, which instances are received by primary database system 1400 and used at updating block 2406 by primary database system 1400 so that latency data area 1522 defines a history repository that stored the historical latency data depicted in Table A.

Referring to Table A, Row 1 specifies reporting data accelerator database system 1500A performing a table modification to table TA associated to query statement Q1. Row 1 specifies that primary database system 1400 can perform a table modification at time T1 and that accelerator database system 1500A replicates the table modification at time T1+0.4 ms.

Row 2 specifies reporting data for query statement Q1 but with respect to the table modification replication of table TA by accelerator database system 1500Z, not accelerator database system 1500A. Row 2 specifies again the original table modification performed by primary database system 1400 at time T1 but specifies a different time for the replication of the table modification by accelerator database system 1500Z at time T1+0.2 ms.

Row 3 pertains to query statement Q2, which can be processed after Q1. The reporting data of Row 3 specifies latency data for a table modification replication performed by accelerator database system 1500A respecting table TB. Regarding query statement Q2, primary database system 1400 can perform an original table modification on table TB at time T2. Row 3 specifies latency data reporting data and indicates that table modification of table TB associated to query Q2 can be performed at time T2, and that the table modification can be replicated by accelerator database system 1500A at time T2+0.6 ms.

Row 4 specifies the replication of the table modification for query statement Q2 specified in Row 3, except as performed by accelerator database system 1500Z and not accelerator database system 1500A. Row 4 includes latency data reporting data specifying that accelerator database system 1500Z can perform replication of the table modification with respect to Table TB associated to query statement Q2 at replication time T2+0.5 ms.

Row 5 references latency data reporting data for processing of query statement Q3, which is another query statement referencing table TA as referenced in Q1. Referring to Row 5, the latency data reporting data can specify that primary database system 1400 can perform original modifying of table TA at time T3, and that accelerator database system 1500A can perform replicating of the modifying performed at time T3 at time T3+0.2 ms.

Row 6 can reference latency data reporting data for a table modification replication performed by accelerator database system 1500Z with respect to query statement Q3. Row 6 specifies again the original table modification performed with respect to table TA at time T3 and that accelerator database system 1500Z can perform replication of the table modification performed a time T3 at time T3+0.3 ms.

Over the course of iterations of reporting block 2504 for a succession of table modifications performed by primary database system 1400 and replicated by accelerator database systems 1500A-1500Z, accelerator database systems 1500A-1500Z can transmit reporting data as specified in Table A, to iteratively update historical table modification replication latency data of latency data area 1422 of data repository 1420 for specific tables and particular accelerator database systems. As described herein, primary database system 1400 by database management system 1410 can use predictive models such as predictive model 3002 and/or predictive model 5002 for return of predictions as to table replication modification latencies associated to specific tables and particular accelerator database systems, which predictive models can be iteratively trained by iterations of historical latency data of latency data area 1422 of data repository 1420. Thus, the iterative reporting of latency data can iteratively adjust predictions returned by predictive models such as predictive model 3002 and/or predictive model 5002.

In response to the receipt of the reporting data sent at reporting block 2504, primary database system 1400 and latency data update process 1434 can perform updating at block 2406. Updating at block 2406 can include updating of latency data area 1422 of data repository 1420 of database management system 1410 of primary database system 1400. The iterative updating in latency data area 1422 results in latency data area 1422 of data repository 1420 defining the history data as shown in table A.

The data of database latency data area 1422 can include historical data and over time can take the form of the data described with reference to table A. Referring to table A, historical data of latency data area 1422 can be characterized by historical latency data parameter values associated to certain tables and specific accelerator database systems. Primary database system 1400 with the historical data characterized by table A can be used for the performance of predictions as to latencies associated to certain tables and specific accelerator database systems which are associated to a primary database system 1400.

Reference is again made to decision block 2402 at which primary database system 1400 routes a query statement to one of the current primary database system 1400 or an accelerator database system in dependence on a classification at block 2401 of the incoming query statement as a primary database query statement or an accelerator database query statement. At block 2402, primary database system 1400 by database management system 1410 can return an action decision to execute the incoming query data sent at block 2601 by an accelerator database system in response to the classifying of the incoming query data as an accelerator database query statement and can return the action decision at block 2402 to execute the incoming query data on primary database system 1400 in response to the classifying at block 2401 of the incoming query data as transaction query data.

On return of the action decision at block 2402 to execute the incoming query data on an accelerator database system, primary database system 1400 by database management system 1410 can proceed to block 2408. At block 2408, primary database system 1400 by database management system 1410 running load balancing process 1432 can execute action decision block 2408. At action decision block 2408, primary database system 1410 by database management system 1410 running load balancing process 1432 can predict the latency associated to executing query data associated by a first accelerator database system and by a second accelerator database system and can select, for processing by runtime execution of the query statement at action decision block 2408, an accelerator database system in dependence on which accelerator database system has a predicted relatively lower associated latency.

In one use case, a selected accelerator database system of accelerator database systems 1500A-1500Z can be configured to execute a query statement, but the selected accelerator database system can be configured so that the selected accelerator database system waits for a database table modification applied at primary database system 1400 to be replicated at the selected accelerator database system before executing the incoming query at the selected accelerator database system.

The predicting at action decision block 2408 can include predicting which of first or second (or Nth) accelerator database systems associated to a primary database system 1400 will produce the fastest (lowest latency) table modification replication of a modification to a certain table on primary database system 1400. The accelerator database system performing the fastest table modification replications can be expected to influence the fastest query statement execution given that the described reference wait times will be the lowest out of a plurality of candidate accelerator database systems.

In one aspect, primary database system 1400 can perform predictions as to table modification replication latencies on a table-by-table basis. Embodiments herein recognize that a table modification replication latency associated to a given accelerator database system can vary on a table-by-table basis. That is, a first table first accelerator database system can produce improved table modification replication latency relative to a second accelerator database system and, with reference to a second table, a second accelerator database system can produce improved table modification replication latency relative to the first accelerator database system, and so on.

In one aspect, primary database system 1400 by database management system 1410 can establish a plurality of predictive models, each predictive model configured to produce a prediction as to a table modification replication latency associated to a certain table of primary database system 1400 by a specific accelerator database system of accelerator database systems 1500A-1500Z.

In one embodiment, the predictive models can be trained with use of machine learning training. In one embodiment, the training data for training the described predictive models can include training data provided by historical latency data, e.g., as shown in table A, that specifies staleness of a table modification replication for certain tables by specific accelerator database systems. In one embodiment, training data for training the described reference predictive model can include parameter values in place of or in addition to table modification replication latency parameter values.

In one embodiment, database management system 1410 at action decision block 2408 can select an accelerator database system for runtime execution processing of a query statement in dependence on multiple factors including the factor described of predicted table modification replication latency. In one embodiment, database management system 1410 can apply Eq. 1 as follows in selecting an accelerator database system.

$$S=F1W1+F2W2+F3W3+F4W4+F5W5 \qquad (Eq.1)$$

Where S is the overall scoring value for scoring a certain accelerator database for executing a query statement referencing a certain table, F1 is a first factor, F2 is a second factor, F3 is a third factor, F4 is a fourth factor, F5 is a fifth factor, and W1-W5 are weights associated to the various factors. Database management system 1410 can score candidate accelerator systems using Eq. 1 and can select for execution of a query statement the accelerator database system producing the highest score.

In one embodiment, F1 can be the predicted table modification replication latency associated to the certain table for a particular candidate accelerator database which can be determined by query of a predictive model 3002 or 5002 herein. F3 can be CPU availability parameter value associated to the certain accelerator database system, F4 can be a memory availability parameter value associated to the certain accelerator database system, and F5 can be a request queue length associated to the certain accelerator database system. Embodiments herein recognize that accelerator database systems can route query statements in waiting to a request queue and that the length of such request queue can impact a latency associated to the query statement execution.

On completion of action decision block 2408 to select an accelerator database system, primary database system 1400 by database management system 1410 can proceed to block 2409. At block 2409, primary database system 1400 by data management system 1410 can send query data defining the query statement sent at block 2601 to the selected accelerator database system of database accelerator database systems 1500A-1500Z selected for processing the incoming query statement in dependence on the predicted latency with which database accelerator systems of the accelerator database systems 1500A-1500Z will replicate a table modification performed by primary database system 1400.

On receipt of the query data sent at block 2409, the selected accelerator database system of accelerator database systems 1500A-1500Z at execute block 2501 can execute the query statement defined by query data sent at block 2601. On completion of execute block 2501, the selected accelerator database system of accelerator database systems 1500A-1500Z at send block 2502 can send query response data to the customer system of customer systems 1600A-1600Z sending the query data sent at block 2601.

Figure 3:
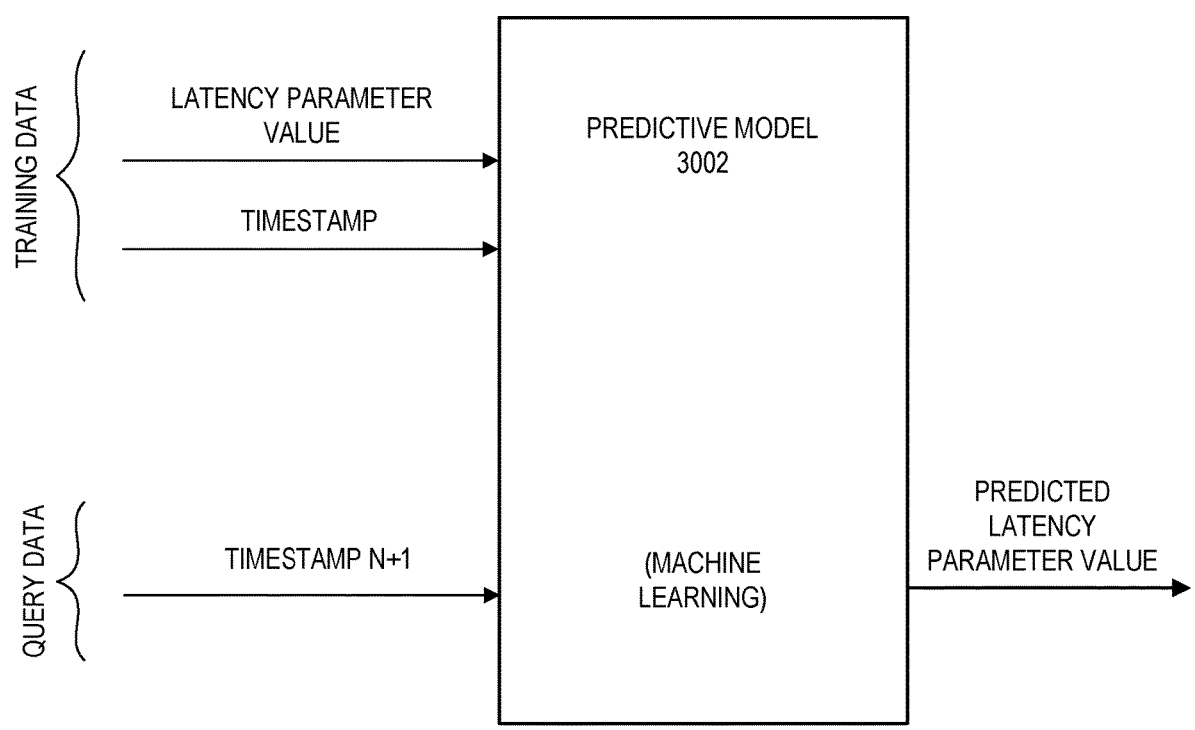
FIG. 3 depicts the predictive model for return of action decisions, according to one embodiment.

For return of the action decision at block 2408, primary database system 1400 by database management system 1410 can query a predictive model configured to return a prediction in respect to latency performance by a certain accelerator database system with respect to a certain table. FIG. 3 illustrates predictive model 3002 for predicting performance of a certain accelerator database system in replicating a table modification with respect to a certain table, where the original modification was originally performed at database 1402. Predictive model 3002 can be trained with training data and once trained can be configured to respond to query data. Training data for training predictive model 3002 can include iterations of training data. An iteration of training data can include (a) a latency parameter value in combination with (b) a timestamp. Several iterations of training data can be applied until predictive model 3002 is able to return predictions. With predictive model 3002 trained, predictive model 3002 can respond to query data. Query data for querying predictive model 3002 can include a timestamp specifying the future time N+1. In response to receipt of the query data, the predictive model can return a prediction. The prediction returned by predictive model 3002 can include a predicted latency parameter value that specifies the time delay with which a certain accelerator database system replicates a table modification originally performed with respect to a specific table of primary database system 1400. In one embodiment, training of predictive model 3002 can include training so that predictive model 3002 is able to provide regression-based predictions.

Figure 4:
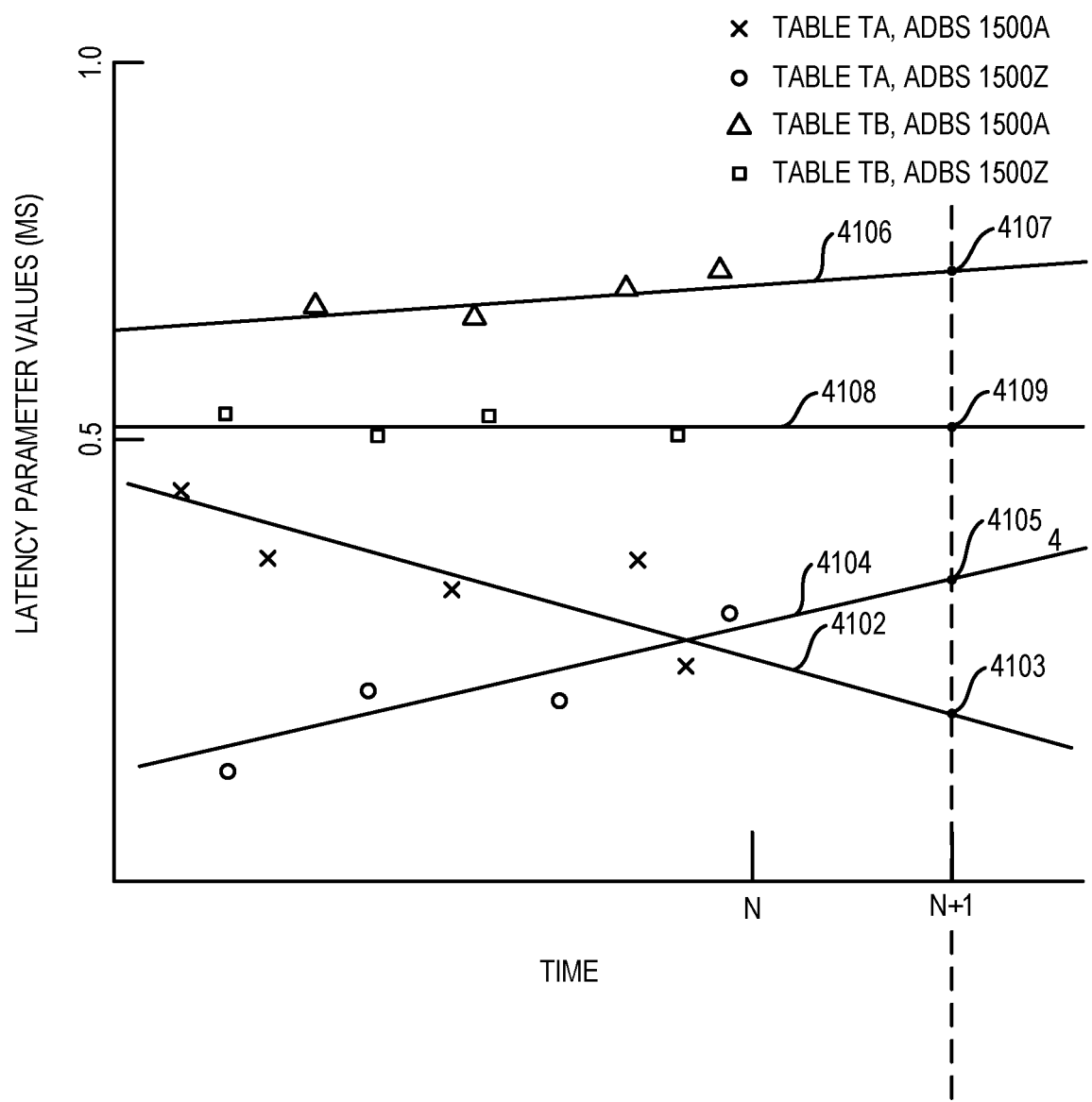
FIG. 4 depicts performance of a regression analysis by a predictive model trained by machine learning, according to one embodiment.

A machine learning model providing regression-based predictions is described with reference to illustrative FIG. 4. In FIG. 4, the X data plots are data plots specifying latency performance values of accelerator database 1500A with respect to table TA. The 0 data plot points are data points specifying latency parameter values of accelerator database 1500Z with respect to table TA. The triangles are data points specifying latency parameter values of accelerator database 1500A in replicating table modifications to table TB and the rectangles are data points specifying latency parameter values of accelerator database 1500Z in the performance of replicating table modifications to table TB. With the latency parameter values examined as shown in FIG. 4, primary database system 1400 by database management system 1410 can provide regression lines.

Regression line 4102 is a regression line for predicting future instances of the X data points. Regression line 4104 is a regression line for predicting future instances of the 0 data points. Regression line 4106 is a regression line for predicting future instances of the triangle data points and regression line 4108 is a regression line for predicting future performance of the box data points.

As shown in FIG. 4, primary database system 1400 by database management system 1410 is able to use the provided regression lines to perform predictions, i.e., for the future time N+1, the data point 4103 is the predicted future parameter value for the X data points. Data point 4105 is the predicted future parameter latency parameter value for the 0 data points. Data point 4107 is the predicted future latency parameter value for the triangle data points and data 4109 is the predicted future parameter value for the box data points.

In one illustrative use case as depicted in FIG. 4, a first accelerator database system 1500A can be predicted to be faster in replicating table modifications relative to a second accelerator database system 1500Z with respect to a first table TA, and first accelerator database system 1500A can be predicted to be slower than second accelerator database system 1500Z with respect to performance of replicating table modifications with respect to table TB.

Embodiments herein recognize that a latency with which a certain accelerator database system can replicate a table modification with respect to a certain table can be in dependence on a variety of accelerator database system characterizing parameter values such as characteristics of the table being replicated, and the number of primary database systems associated to the accelerator database system. For example, with reference to FIG. 1, accelerator database system 1500A in one illustrative implementation can be associated to a single primary database system, namely primary database system 1400, whereas accelerator database system 1500Z, in one illustrative use case, can be associated to both primary database system 1400 as well as primary database system 1400X configured according to primary database system 1400. In such a use case, accelerator database system 1500Z can be relatively slower than accelerator database system 1500A in the performance of replicating table modifications, given that accelerator database system 1500Z can be expected to be performing table modifications with respect to multiple primary database systems.

Figure 5:
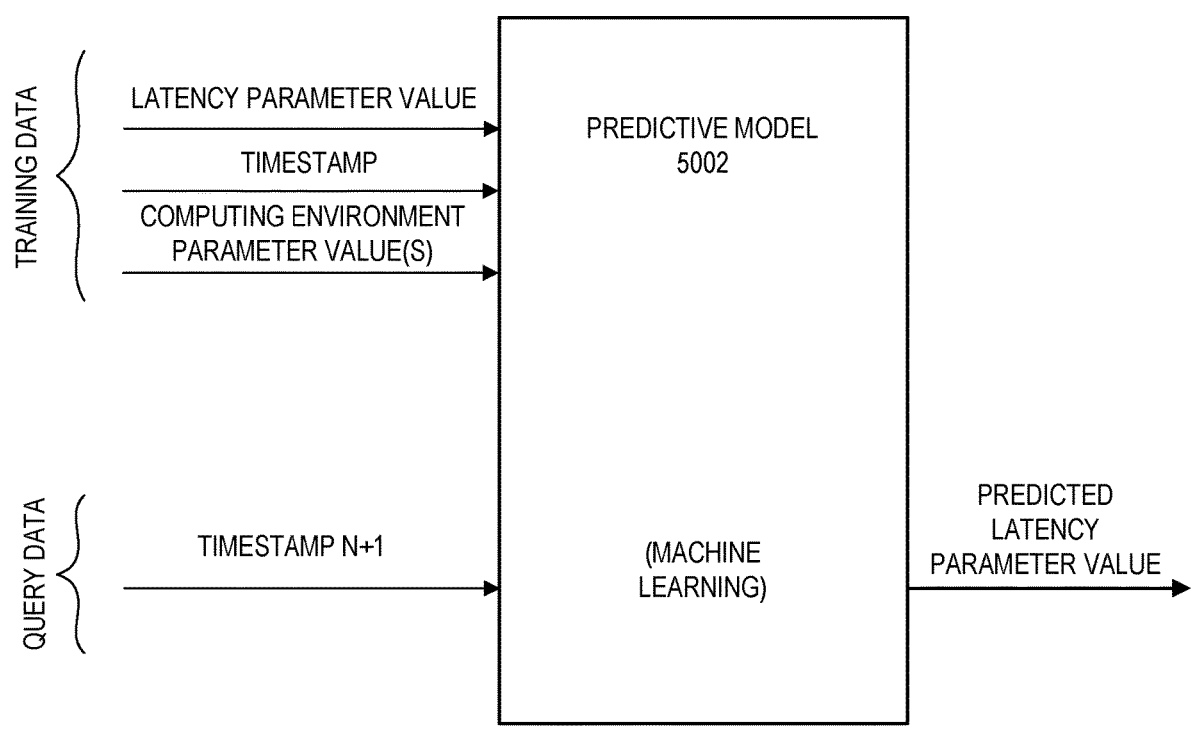
FIG. 5 depicts a predictive model trained by machine learning, according to one embodiment.

Referring to FIG. 5, predictive model 5002 can be trained with use of additional parameter values, such as parameter values specifying a number of parameter database systems associated to a given accelerator database system computing environment parameter values characterizing the computing environment hosting the particular accelerator database system. Computing environment parameter values can include, e.g., infrastructure parameter values specifying characterizations of computing nodes provided by physical computing nodes providing hosting for an accelerator database system, virtualization parameter values specifying attributes of virtual machines for hosting a particular accelerator database system, and utilization parameter values such as infrastructure utilization parameter values and network utilization parameter values associated to a computing environment that hosts a particular accelerator database system. Predictive model 5002, once trained, can be configured to respond to query data. Query data, as explained with reference to predictive model 3002, can take the form of a timestamp specifying a future time, such as time N+1. In response to the input of the query data, predictive model 5002 can return a prediction. The prediction can include a predicted latency parameter value for a certain accelerator database system performing replication of a table modification with respect to a certain table.

Given that the latency parameter values used for training predictive model 3002 can be influenced by the described computing environment parameter values, predictive model 3002 can in many use cases provide predictions with sufficient accuracy. Nevertheless, as illustrated with reference to predictive model 5002 as shown in FIG. 5, additional training with use of additional parameter values, such as computing environment parameter values, can be expected to return predictions in dependence on additional parameter values.

Primary database system 1400 by database management system 1410 can be configured to iteratively apply iterations of training data to predictive model 3002 and/or predictive model 5002 to iteratively adjust predictions returned by predictive model 3002 and/or predictive model 5002. Iterations of training data can be iteratively applied at updating block 2406 (FIG. 2).

Various available tools, libraries, and/or services can be utilized for implementation of predictive model 3002 and/or predictive model 5002. For example, a machine learning service can provide access to libraries and executable code for support of machine learning functions. A machine learning service can provide access to a set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, monitoring and retraining deployed models. According to one possible implementation, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM® WATSON® can provide access to a set of REST APIs that can be called from any programming language and that permit the integration of predictive analytics into any application. Predictive model 3002 and/or predictive model 5002 can employ, e.g., neural networks, support vector machines (SVM), Bayesian networks, and/or other machine learning technologies.

On completion of updating at block 2406, primary database system 1400 can proceed to return block 2407. At return block 2407, primary database system 1400 can return to a stage preceding classifying block 2401 to receive a next iteration of query data defining a query statement. For the time that incoming query statements are classified as being transaction query statements, primary database system 1400 can iteratively perform the loop of blocks 2401-2407 in order to iteratively execute an incoming query statement at execute block 2403 on primary database system 1400, can iteratively capture logging data that specifies actions for performance of modification to a table referenced by an incoming query statement at block 2405, and can iteratively perform updating at block 2406 of latency data area 1422 using latency data included within reporting data received from accelerator database systems that replicate a table modification performed at an iteration of block 2403 by execute block 2403. Accelerator database systems 1500A-1500Z on completion of reporting block 2504 can proceed to return block 2505. At return block 2505, accelerator database systems 1500A-1500Z can return to a stage preceding block 2501. Accelerator database systems 1500A-1500Z can iteratively perform the loop of blocks 2501-2505 for a deployment period of system 100. Customer systems 1600A-1600Z on completion of block 2601 can proceed to return block 2602. At return block 2602 customer systems 1600A-1600Z can return to a stage preceding block 2601. Customer systems 1600A-1600Z can iteratively perform the loop of blocks 2601 and 2601 during a deployment period of system 100.

As set forth herein, a variety of different parameter values can impact table modification replication latency so that a first and second tables have different modification replication latencies between first and second different accelerator database systems. In Example 1 hereinbelow there is illustrated a scenario in which there can be different modification replication latencies for a given table between different accelerator database systems.

Example 1

In one use case scenario, primary database system 1400 replicates table TA, table TB, and table TC to accelerator database system 1500A and primary database system 1400 replicates table TA and Table TB to accelerator database system 1500Z. In the described use case scenario, table TA has constant update modifications throughout the day, and table TB is mainly subject to update modifications with a few long transactions in the morning. Table TC is subject to update modifications randomly throughout the day.

In the described scenario, and assuming all else are similar and no update modification activities on table TC, replication latencies for table TA and table TB should be similar. When there are extensive update modifications on table TC in the afternoon, latency for table TA on accelerator database system 1500A could be impacted while table TB is not because there is no update modification in the afternoon. If there are concurrent queries that reference table TA and table TB separately, the workload balance algorithm may favor accelerator database system 1500A for queries on table TA while queries on table TB may favor accelerator database system 1500A because while latency of table TB may be similar between accelerator database system 1500A and accelerator database system 1500Z, the queue length on accelerator system 1500Z is longer because of queries on table TA. In another variation, there can be multiple primary database systems connected to the accelerator database systems adding more variation to the above scenarios.

[End of Example 1]

Figure 6:
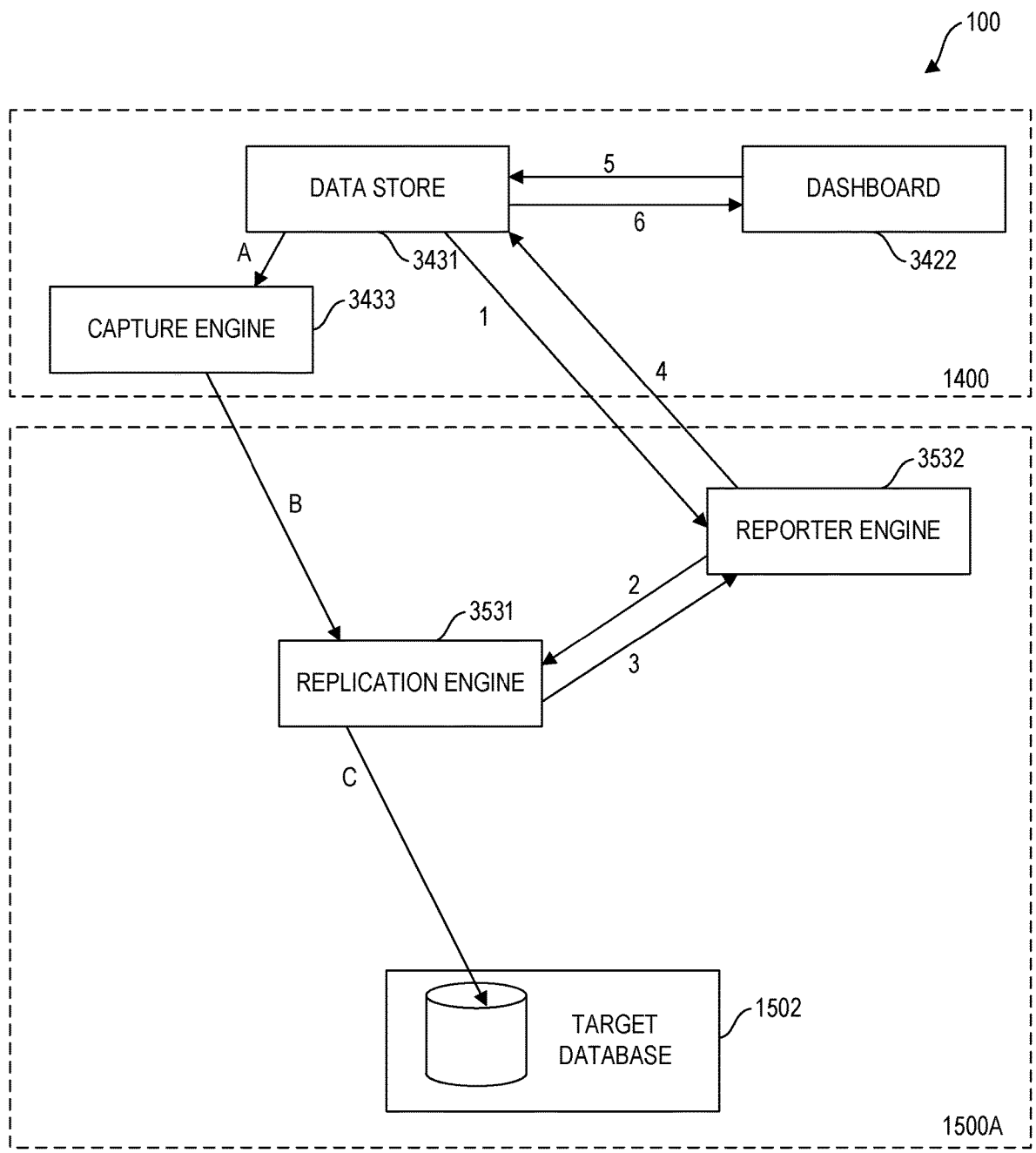
FIG. 6 is a flowchart depicting performance of a method by a primary database interoperating with an accelerator database system, according to one embodiment.
Figure 7:
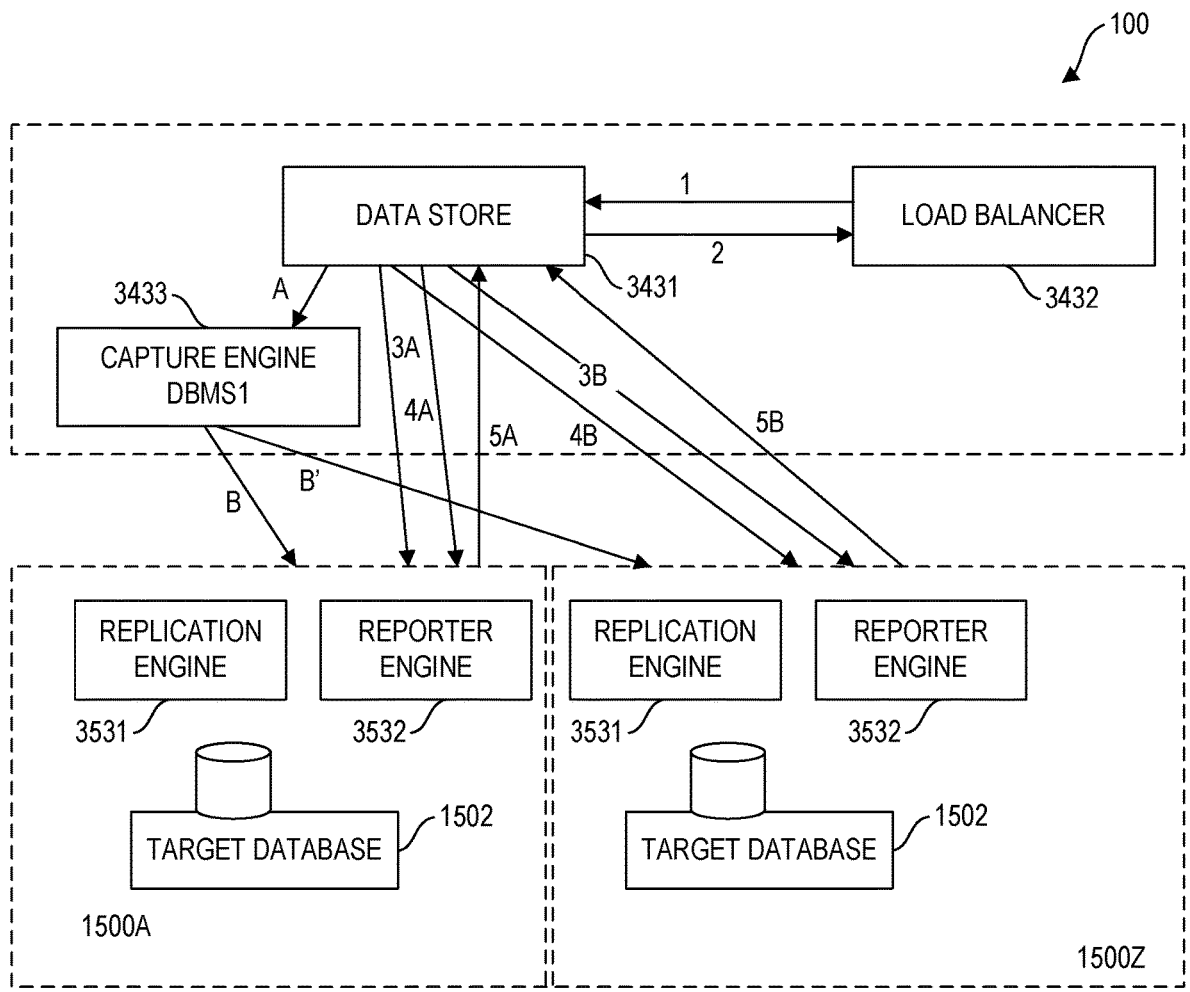
FIG. 7 is a flowchart depicting performance of a method by a primary database interoperating with a plurality of accelerator database systems, according to one embodiment.

Additional aspects of system 100, according to one embodiment, are described in reference to FIGS. 6 and 7.

At (1), data store 3431 of the source database management system (DBMS) 1410, which can include data repository 1420, sends timestamps specifying a time or most recent modification for all replicated tables ($TS_{1-n}$) to reporter engine 3532 of accelerator database system 1500A periodically on a heartbeat message. At (2), reporter engine 3532 sends timestamp information ($TS_{1-n}$) to replication engine 3531. At (3), when replication engine 3531 responds, it sends latency data provided by staleness information ($TS_{1-n}$-$Th_{replication1-n}$) based on the timestamp of the replication tables it currently has replicated. At (4), reporter engine 3532 periodically sends the staleness information for all the tables in replication to data store 3431 of source DBMS 1410 on a heartbeat message. At (5), dashboard 3422 queries data store 3431 for staleness information on replicated tables. At (6), data store 3431 sends requested staleness information on replicated tables to dashboard 3422. Dashboard 3422 composes reports on replicated tables on demand or provides 'live view' of replication latencies of each table. A, B, and C of FIG. 6 indicate the data replication process from source to target, and capture engine 3433 and replication engine 3531 orchestrate the process.

Referring to the flowchart of FIG. 7, load balancer 3432 at (1) fetches latency information from data store 3431 of DBMS 1410. At (2), load balancer 3432 returns routing decision data based on the accelerator database system that has the lowest replication latency for the tables referenced in an incoming query statement.

At (3a), DBMS 1410 based on the routing decision data of data store 3431 can route a query statement to accelerator database system 1500A based on the input from load balancer 3432. At (3b), DBMS 1410 based on the routing decision data of data store 3431 can route the query statement to accelerator database system 1500Z based on input from load balancer 3432. At (4a), data store 3431 sends a timestamp specifying a time of most recent modification for all replicated tables ($TS_{1-n}$) to accelerator database system 1500A periodically on a heartbeat message. At (4b), data store 3431 sends a timestamp specifying a time for most recent modification for all replicated tables ($TS_{1-n}$) to accelerator database system 1500Z periodically on a heartbeat message. At (5a), accelerator database system 1500A periodically sends the latency data staleness information for all the tables in replication to data store 3431 on a heartbeat message. At (5b), accelerator database system 1500Z periodically sends the latency data staleness information for all the tables in replication to data store 3431 on a heartbeat message. In the flowchart of FIGS. 7, A, B, and B' indicate the data replication process from source to target and capture engine 3433, and replication engine 3431 of accelerator database system 1500A and accelerator database system 1500Z orchestrate the process.

Embodiments herein provide for tracking staleness of data in a database accelerator system on a table level. Tracking can be provided using global time stamps that are derived from transaction log records written by a source primary database system. Fine-grained latency data staleness information can be useful for tuning several accelerator-specific tasks, such as query scheduling. Embodiments herein further integrate the described latency data information into the workload management module for optimizing query routing. As technical effect, query statements may be executed faster if the data replication latency is considered when making more accurate routing decisions between multiple accelerator instances. Further, with the help of such latency data staleness-based routing decision, the data replication process for the most outdated data copy may be accelerated given that increased processing resources can be spent on applying replicated changes when queries are routed to more recent data copies to alleviate a need to be processed in parallel. Consequently, the replication performance regulates itself autonomously.

Figure 8:
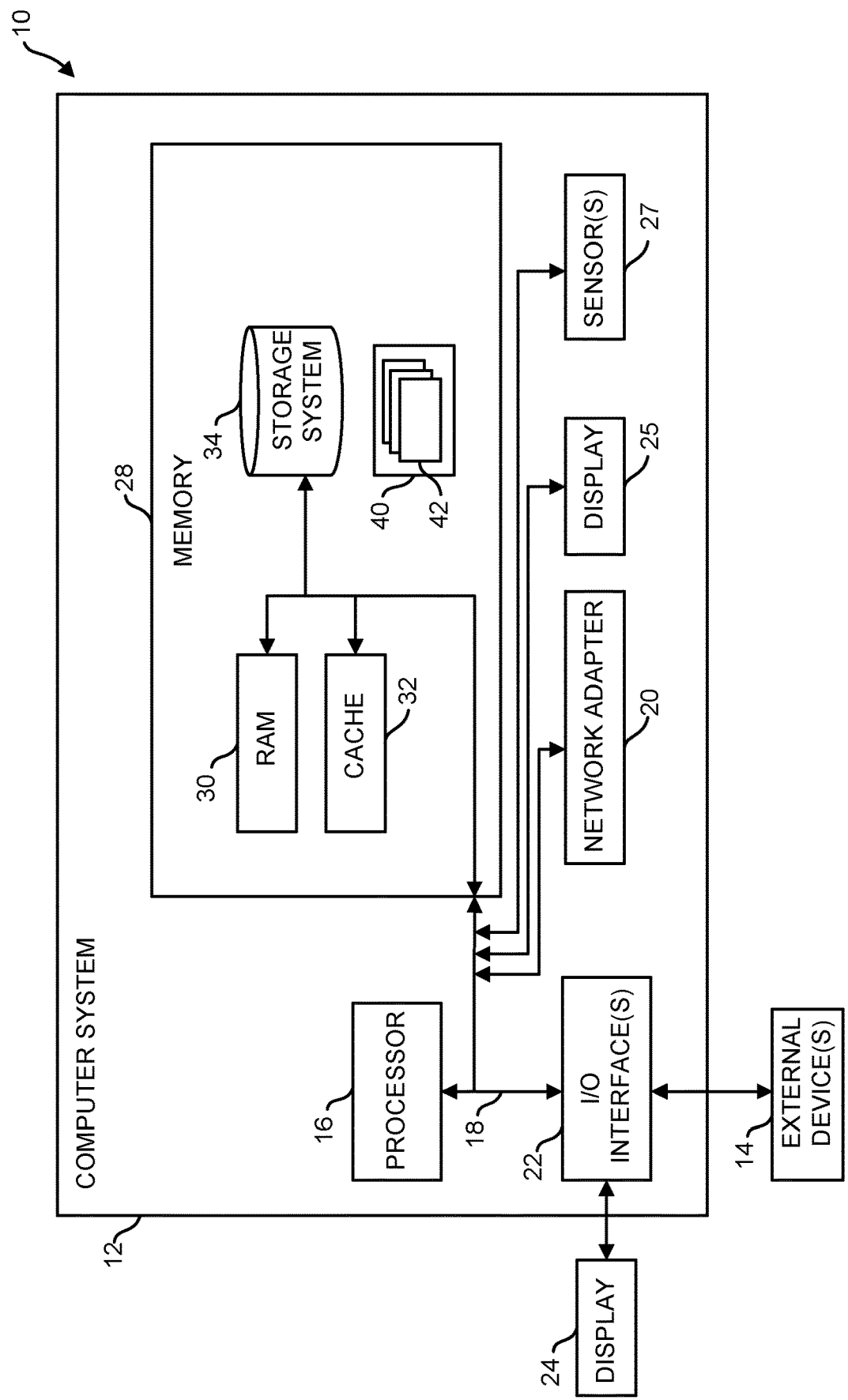
FIG. 8 depicts a computing node according to one embodiment.
Figure 9:
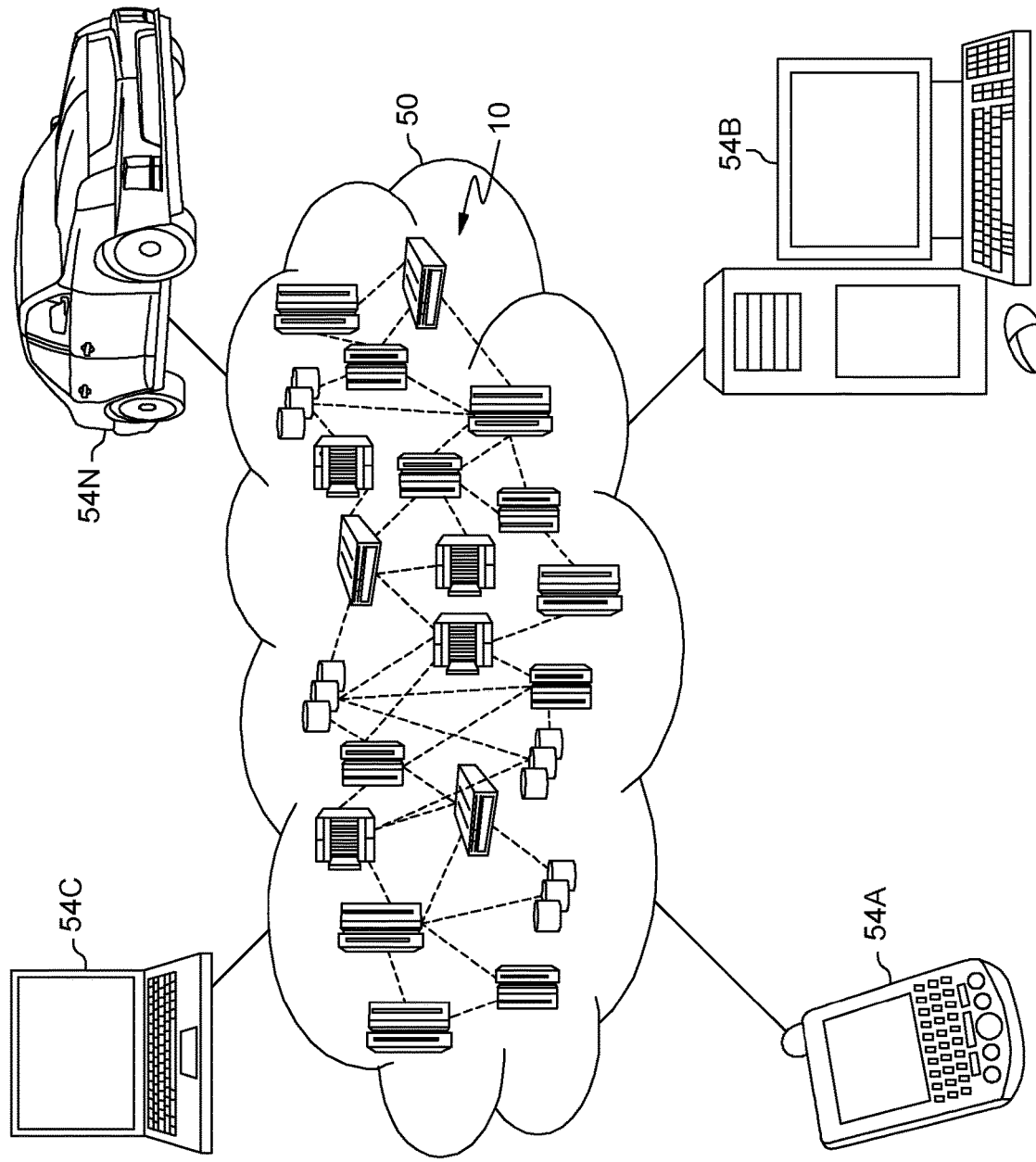
FIG. 9 depicts a cloud computing environment according to one embodiment.
Figure 10:
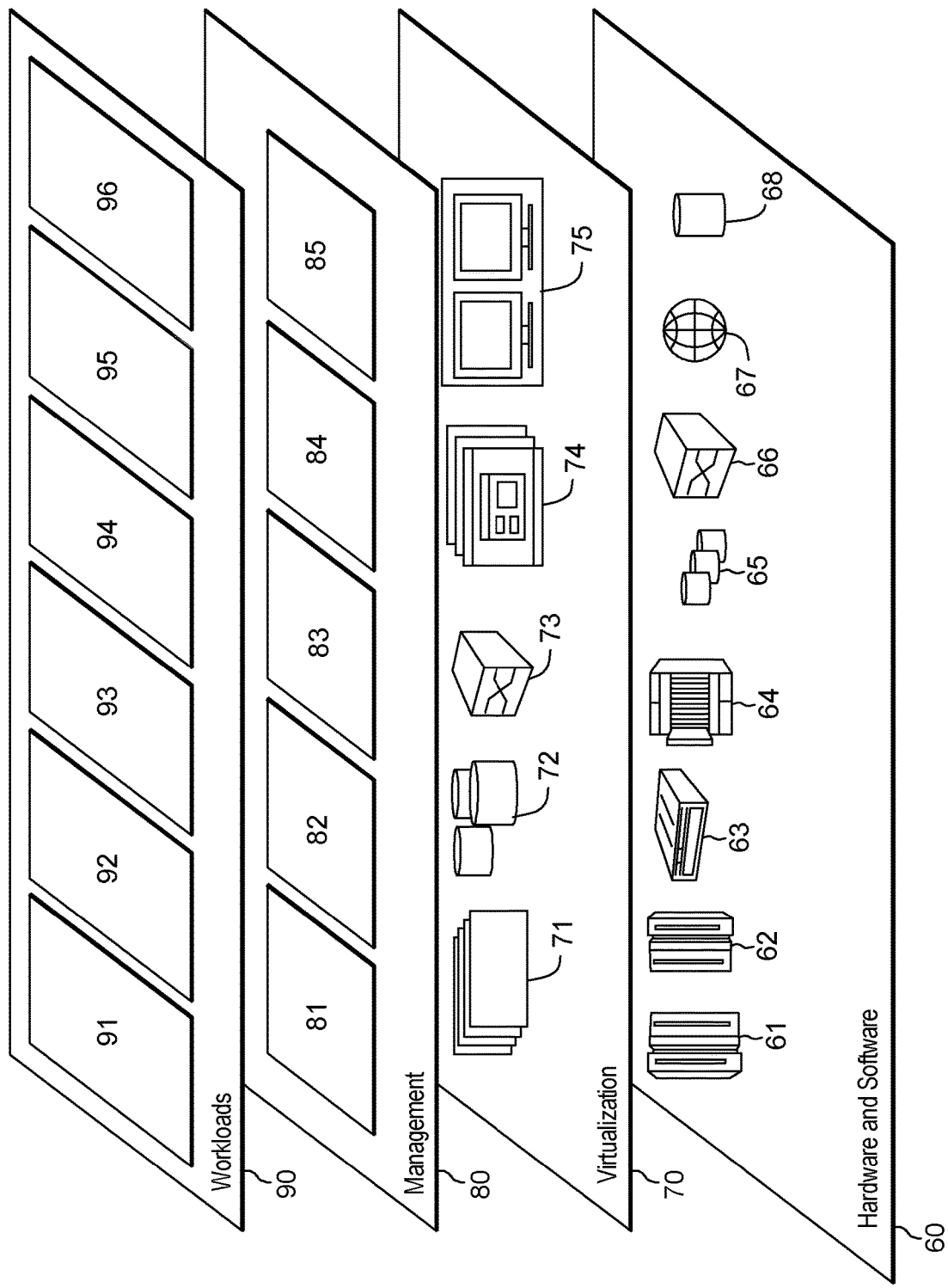
FIG. 10 depicts abstraction model layers according to one embodiment.

Certain embodiments herein may offer various technical computing advantages, involving computing advantages and practical applications to address problems arising in the realms of computer networks and computer systems. Embodiments herein can reduce latencies in the execution of query statements by a system having a primary database system and an accelerator database system. Embodiments herein can provide for reporting of latency parameter values associated to replications of table modifications performed by an accelerator database system replicating a modification performed on a primary database system. Reporting data specifying latency parameter values specify latencies associated to replicating table modifications can be sent to a primary database which can store the latency parameter value reporting data into a latency data area of a data repository. The latency data area can define a history repository of historical latency parameter values. A primary database system by a database management system can perform a query handling process. A load balancer process can use historical data including historical latency parameter values for return of predictions as to which of a plurality of candidate accelerator database systems will more quickly replicate a table modification. Based on prediction data that specifies prediction as to which of a candidate accelerator database system will more quickly replicate a table modification, a primary database system running a load balancer can select one of the plurality of accelerator database systems, i.e., the one predicted to more quickly replicate a table modification as the selected accelerator database system for performance and execution of a current query statement. Various decision data structures can be used to drive artificial intelligence (AI) decision making. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerator graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, primary database 1400 can include one or more computing node 10 and can include one or more program 40 for performing functions described with reference to primary database 1400 as set forth in the flowcharts of FIG. 2, FIG. 6, and FIG. 7. In one embodiment, accelerator database system 1500A-1500Z can include one or more computing node 10 and can include one or more program 40 for performing functions described with reference to primary database 1400 as set forth in the flowcharts of FIG. 2, FIG. 6, and FIG. 7. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g., can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for query processing as set forth herein. The processing components 96 can be implemented with use of one or more program 40 described in FIG. 8.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
receiving by primary database system a query statement that references a first table, wherein the primary database system is associated to a first accelerator database system and a second accelerator database system;
examining latency data that specifies a latency with which a modification to the first table has been replicated into the first accelerator database system and a latency with which a modification to the first table has been replicated into the second accelerator database system, wherein the examining includes examining historical latency data that specifies latencies of a history of replications of modifications of the first table;
selecting, in dependence on the examining, the first accelerator database system for execution of the query statement; and
routing the query statement to the first accelerator database system for execution in response to the selecting.

2. The computer implemented method of claim 1, wherein the selecting, in dependence on the examining, the first accelerator database system for execution of the query statement includes predicting, based on the examining, that the first accelerator database system will perform a replication of a modification to the first table with shorter latency than the second accelerator database system.

3. The computer implemented method of claim 1, wherein the examining latency data that specifies a latency with which a modification to the first table has been replicated into the first accelerator database system and a latency with which a modification to the first table has been replicated into the second accelerator database system includes examining historical latency data that specifies latencies of a history of replications of modifications of the first table by the first accelerator database system, and latencies of a history of replications of modifications of the first table by the second accelerator database system, and wherein the selecting, in dependence on the examining, the first accelerator database system for execution of the query statement includes performing the selecting in dependence on the examining of the historical latency data.

4. The computer implemented method of claim 1, wherein the selecting, in dependence on the examining, the first accelerator database system for execution of the query statement includes predicting, based on the examining, that the first accelerator database system will perform a replication of a modification to the first table with shorter latency than the second accelerator database system, wherein the predicting includes querying a predictive model that has been trained with machine learning training data specifies latencies of a history of replications of modifications of the first table by the first accelerator database system, and latencies of a history of replications of modifications of the first table by the second accelerator database system.

5. The computer implemented method of claim 1, wherein the selecting, in dependence on the examining, the first accelerator database system for execution of the query statement includes predicting, based on the examining, that the first accelerator database system will perform a replication of a modification to the first table with shorter latency than the second accelerator database system, wherein the predicting includes querying a linear regression predictive model that has been trained with machine learning training data specifies latencies of a history of replications of modifications of the first table by the first accelerator database system, and latencies of a history of replications of modifications of the first table by the second accelerator database system, and wherein the linear regression predictive model is configured to output linear regression based predictions.

6. The computer implemented method of claim 1, wherein the method includes receiving by the primary database system a second query statement that references a second table, wherein the method includes examining latency data that specifies a latency with which a modification to the second table has been replicated into the first accelerator database system and a latency with which a modification to the second table has been replicated into the second accelerator database system, performing selecting, in dependence on the examining, the second accelerator database system for execution of the second query statement; and routing the second query statement to the second accelerator database system for execution in response to the performing selecting.

7. A computer program product comprising:
a computer readable storage medium readable by one or more processing circuit and storing instructions for execution by one or more processor for performing a method comprising:
receiving by a primary database system a query statement that references a first table, wherein the primary database system is associated to a first accelerator database system and a second accelerator database system;
examining latency data that specifies a latency with which a modification to the first table has been replicated into the first accelerator database system and a latency with which a modification to the first table has been replicated into the second accelerator database system, wherein the examining includes examining historical latency data that specifies latencies of a history of replications of modifications of the first table;
selecting, in dependence on the examining, the first accelerator database system for execution of the query statement; and
routing the query statement to the first accelerator database system for execution in response to the selecting.

8. The computer program product of claim 7, wherein the method includes selecting, in dependence on the examining, the first accelerator database system for execution of the query statement includes predicting, based on the examining, that the first accelerator database system will perform a replication of a modification to the first table with shorter latency than the second accelerator database system.

9. A system comprising:
a memory;
at least one processor in communication with the memory; and
program instructions executable by one or more processor via the memory to perform a method comprising:
receiving by a primary database system a query statement that references a first table, wherein the primary database system is associated to a first accelerator database system and a second accelerator database system;
examining latency data that specifies a latency with which a modification to the first table has been replicated into the first accelerator database system and a latency with which a modification to the first table has been replicated into the second accelerator database system, wherein the examining includes examining historical latency data that specifies latencies of a history of replications of modifications of the first table;
selecting, in dependence on the examining, the first accelerator database system for execution of the query statement; and
routing the query statement to the first accelerator database system for execution in response to the selecting.

10. The system of claim 9, wherein the selecting, in dependence on the examining, the first accelerator database system for execution of the query statement includes predicting, based on the examining, that the first accelerator database system will perform a replication of a modification to the first table with shorter latency than the second accelerator database system.

11. The system of claim 9, wherein the examining latency data that specifies a latency with which a modification to the first table has been replicated into the first accelerator database system and a latency with which a modification to the first table has been replicated into the second accelerator database system includes examining historical latency data that specifies latencies of a history of replications of modifications of the first table by the first accelerator database system, and latencies of a history of replications of modifications of the first table by the second accelerator database system, and wherein the selecting, in dependence on the examining, the first accelerator database system for execution of the query statement includes performing the selecting in dependence on the examining of the historical latency data.

12. The system of claim 9, wherein the selecting, in dependence on the examining, the first accelerator database system for execution of the query statement includes predicting, based on the examining, that the first accelerator database system will perform a replication of a modification to the first table with shorter latency than the second accelerator database system, wherein the predicting includes querying a predictive model that has been trained with machine learning training data specifies latencies of a history of replications of modifications of the first table by the first accelerator database system, and latencies of a history of replications of modifications of the first table by the second accelerator database system.

13. The computer implemented method of claim 1, wherein the examining latency data that specifies a latency with which a modification to the first table has been replicated into the first accelerator database system and a latency with which a modification to the first table has been replicated into the second accelerator database system includes examining historical latency data that specifies latencies of a history of replications.

14. The computer implemented method of claim 1, wherein the examining latency data that specifies a latency with which a modification to the first table has been replicated into the first accelerator database system and a latency with which a modification to the first table has been replicated into the second accelerator database system includes examining historical latency data.

15. The computer implemented method of claim 1, wherein the examining includes examining historical latency data that specifies latencies of a history of replications of modifications of the first table by the first accelerator database system, and latencies of a history of replications of modifications of the first table by the second accelerator database system.

16. The system of claim 9, wherein the examining latency data that specifies a latency with which a modification to the first table has been replicated into the first accelerator database system and a latency with which a modification to the first table has been replicated into the second accelerator database system includes examining historical latency data that specifies latencies of a history of replications.

17. The system of claim 9, wherein the examining latency data that specifies a latency with which a modification to the first table has been replicated into the first accelerator database system and a latency with which a modification to the first table has been replicated into the second accelerator database system includes examining historical latency data.

18. The system of claim 9, wherein the examining includes examining historical latency data that specifies latencies of a history of replications of modifications of the first table by the first accelerator database system, and latencies of a history of replications of modifications of the first table by the second accelerator database system.

19. The computer implemented method of claim 1, wherein modifications performed on tables of the primary database system are iteratively replicated into the first accelerator database system and the second accelerator database system.

20. The system of claim 9, wherein modifications performed on tables of the primary database system are iteratively replicated into the first accelerator database system and the second accelerator database system.

\* \* \* \* \*